United States Patent
Huang et al.

(10) Patent No.: US 9,752,560 B2
(45) Date of Patent: Sep. 5, 2017

(54) WIND TURBINE GENERATOR SYSTEM AND LIGHTNING PROTECTION DEVICE THEREOF

(75) Inventors: Jinpeng Huang, Beijing (CN); Uwe Hinz, Weddingstedt (DE); Qiang Li, Beijing (CN); Junhao Ge, Beijing (CN); Wei Yang, Beijing (CN)

(73) Assignee: XINJIANG GOLDWIND SCIENCE & TECHNOLOGY CO., LTD, Urumqi (CN)

( * ) Notice: Subject to any disclaimer, the term of this patent is extended or adjusted under 35 U.S.C. 154(b) by 502 days.

(21) Appl. No.: 14/366,753

(22) PCT Filed: Jul. 26, 2012

(86) PCT No.: PCT/CN2012/079189
§ 371 (c)(1),
(2), (4) Date: Jun. 19, 2014

(87) PCT Pub. No.: WO2013/091380
PCT Pub. Date: Jun. 27, 2013

(65) Prior Publication Data
US 2014/0348656 A1    Nov. 27, 2014

(30) Foreign Application Priority Data

Dec. 23, 2011   (CN) .......................... 2011 1 0440053

(51) Int. Cl.
F03D 11/00 (2006.01)
H02G 13/00 (2006.01)
F03D 80/30 (2016.01)

(52) U.S. Cl.
CPC .......... *F03D 11/0033* (2013.01); *F03D 80/30* (2016.05); *H02G 13/80* (2013.01); *Y02E 10/72* (2013.01)

(58) Field of Classification Search
CPC .......... F03D 80/00; F03D 80/30; F03D 80/70; F03D 11/0033; F03D 80/80; F03D 80/82;
(Continued)

(56) References Cited

U.S. PATENT DOCUMENTS 6,612,810 B1 * 9/2003 Olsen ...................... F03D 80/30
415/4.5
7,377,750 B1    5/2008 Costin et al.
(Continued)

FOREIGN PATENT DOCUMENTS

CN    101509469 A    8/2009
CN    202082053 U    12/2011
(Continued)

OTHER PUBLICATIONS

International Search Report dated Nov. 15, 2012 corresponding to PCT/CN2012/079189, 3 pp.
(Continued)

*Primary Examiner* — Gregory Anderson
*Assistant Examiner* — Julian Getachew
(74) *Attorney, Agent, or Firm* — Ohlandt, Greeley, Ruggiero & Perle, LLP

(57) ABSTRACT

A lightning protection device for a wind turbine generator system includes at least a blade arrester, a down lead of a blade connected to the blade arrester, a lightning-proof element of a pitch bearing, a lightning-proof element of a rotor bearing. The lightning-proof element of the pitch bearing is arranged at the blade root, with one end connected to the down lead of blade and the other end connected to the lightning-proof element of the rotor bearing. The lightning protection device forms a lightning current conducting path passing through a cavity of the pitch bearing, a hollow of a rotor shaft and a cavity of the rotor bearing. A wind turbine
(Continued)

generator system having the above mentioned lightning protection device is provided.

14 Claims, 3 Drawing Sheets

(58) Field of Classification Search
CPC ..... F03D 80/85; Y02E 10/721; Y02E 10/722; H02G 13/80
See application file for complete search history.

(56) References Cited

U.S. PATENT DOCUMENTS

| | | | |
|---|---|---|---|
| 7,390,169 B2 * | 6/2008 | Larsen | H02G 13/00 416/146 R |
| 2012/0269631 A1 * | 10/2012 | Lewke | F03D 11/0033 416/146 R |

FOREIGN PATENT DOCUMENTS

| | | |
|---|---|---|
| DE | 202006000673 U1 | 6/2006 |
| EP | 1568883 A2 | 8/2005 |
| WO | 2009056121 A2 | 5/2009 |
| WO | 2010119027 A2 | 10/2010 |
| WO | 2011069686 A1 | 6/2011 |

OTHER PUBLICATIONS

Extended European Search Report dated Jul. 16, 2015 from corresponding International Application No. 12860671.2-1607, 6 pages.

* cited by examiner

WIND TURBINE GENERATOR SYSTEM AND LIGHTNING PROTECTION DEVICE THEREOF

CROSS-REFERENCE TO RELATED APPLICATIONS

This application is a national phase of international application No. PCT/CN2012/079189, filed Jul. 26, 2012, which claims priority to Chinese patent application No. 201110440053.1 titled "WIND TURBINE GENERATOR SYSTEM AND LIGHTNING PROTECTION DEVICE THEREOF" and filed with the State Intellectual Property Office on Dec. 23, 2011, which are incorporated herein by reference in their entirety.

TECHNICAL FIELD

The present invention relates to wind power generation technology, and more particularly relates to a lightning protection device for a wind turbine generator system and to a wind turbine generator system comprising the lightning protection device.

BACKGROUND ART

As the development of the wind turbine technology, the height of a wind turbine generator system is increasing. Currently, the height of the new type of wind turbine generator system can reach and even exceed 160 meters. However, the wind turbine generator system is typically mounted on high altitude terrains or seaboard regions which are relatively open and tends to suffer from lightning strikes as a prominent object within these areas for their height. It is necessary to provide a lightning protection device for a wind turbine generator system so that the wind turbine generator system can be prevented from being damaged by the lightning strikes.

Currently, a Permanent Magnet Direct-Driven (PMDD) wind turbine generator system is usually protected against damages due to lightning strikes with the following method. The entire PMDD wind turbine generator system uses metal casting parts, structural parts and bearings of its own as the conducting paths, except that separate cable wires used inside of the blades. Specifically, the down lead of the blade arrester is connected directly to the flange at the roots of the blades of the PMDD wind turbine generator system; the flange is connected to the hub via the pitch bearing; the hub is connected to the generator via the main rotor bearing of the generator; the generator is connected to the base frame of the nacelle which is connected to the tower by the yaw bearing; and the tower is connected to the ground; thus, the lightning current can be conducted into ground.

However, according to the method mentioned-above, the lightning current will certainly flow through the pitch bearing, the main shaft bearing and the yaw bearing of the PMDD wind turbine generator system. Because of the gaps in the bearings, the impedance of the path through which the lightning current passes is high, which influences the discharging of the lightning current. Consequently, there is a chance that the bearings would be burned and thus damaged by the lightning current. However, the operations of replacing the bearings of the wind turbine generator system are complicated and the total cost of maintenance will be increased. Further, bearing damage will result in operation interruption of the wind turbine generator system, which may also result in huge economical loss and maintenance cost.

SUMMARY

In order to solve the above problems in the prior art, the present invention provides a lightning protection device, which can directly discharge the lightning current into the ground effectively. The lightning current will not pass through the pitch bearing and the main rotor bearing but by-pass the pitch bearing and the main rotor bearing, reducing the impedance of the discharging path of the lightning current. This lighting protection device insures that the bearings and other components of the wind turbine generator system will not be damaged by the lightning current.

According to the present invention, a wind turbine generator system has an independent discharging path of the lightning current so that the pitch bearing, the main rotor bearing and other components thereof will not be damaged as discharge of the lightning current is blocked. As a result, the wind turbine generator system can be efficiently protected, and the failure ratio of the wind turbine generator system is reduced.

In order to solve the above-mentioned technical problems, the present invention illustrates a lightning protection device for a wind turbine generator system. The wind turbine generator system comprises a rotor connected with a hub and at least one rotor blade, wherein the rotor blade is connected to the hub via a blade pitch bearing, the hub is connected to a hollow rotor shaft and the hollow rotor shaft is supported by at least one rotor bearing, and wherein the pitch bearing provides a cavity therein and the rotor bearing provides a cavity defined by the inner diameter of each bearing. The lightning protection device includes a blade arrester located near the blade tip and located at the side of the blade, a down lead of blade electrically connected to the blade arrester, a lightning proof element of the pitch bearing, a lightning proof element of rotor bearing, wherein the lightning-proof element of the pitch bearing is provided at the blade root, one end of the lightning-proof element of the pitch bearing is connected to the down lead of blade and the other end is connected to the lightning-proof element of the rotor bearing. The lightning protection device forms a conducting path for the lightning current which passes through the cavity of the pitch bearing, the hollow portion of the hollow rotor shaft and the cavity of the rotor bearing.

Wherein, the lightning-proof element of the pitch bearing includes a flexible insulated cable. The lightning-proof element of the pitch bearing further includes a tensioned rope for limiting the position. The tensioned rope has two ends, the one is connected to a fixed point at the blade and the other one is connected to a fixed point at the hub. The flexible insulated cable has at least one point fixed to the tensioned rope. Moreover, the flexible insulated cable of the lightning-proof element of the pitch bearing is tensioned between the fixed point at the blade and the fixed point at the hub along in the direction of the axis of the blade bearing.

Alternatively, the lightning-proof element of the pitch bearing further includes a tube provided in the cavity of the pitch bearing for limiting the position. The flexible insulated cable is guided through the tube and can rotate in the tube. Wherein, the lightning-proof element of the pitch bearing includes a slip ring with at least one brush.

Furthermore, the lightning-proof element of the rotor bearing includes a slip ring with at least one brush. Further, the brush of the lightning-proof element of the rotor bearing is rotating with the hub and fixed to the hub or to the hollow rotor shaft, and the slip ring of the lightning-proof element of the rotor bearing is fixed to the axle or to the base frame of the generator. Alternatively, the slip ring of the lightning-proof element of the rotor bearing is rotating with the hub and is fixed to the hub or to the hollow rotor shaft, and the brush of the lightning-proof element of the rotor bearing is fixed to the axle or to the base frame of the generator.

Wherein, the slip ring of the lightning-proof element of the rotor bearing is arranged around an electrical or hydraulic slip ring unit of the wind turbine generator system.

Alternatively, the slip ring of the lightning-proof element of the rotor bearing is integrated into the electrical or hydraulic slip ring unit of the wind turbine generator system.

Wherein, one end of the lightning-proof element of the rotor bearing is electrically connected to the axle or the base frame of the generator.

Wherein, one end of the lightning-proof element of the rotor bearing is electrically connected to a lightning-proof element of a yaw bearing and the lightning-proof element of the yaw bearing is electrically connected to a tower.

Preferably, the lightning-proof element of the yaw bearing includes a flexible insulated cable. One end of the flexible insulated cable is fixed to the base frame and is electrically connected to the lightning-proof element of the rotor bearing, while the other end is fixed to the tower. Moreover, the flexible insulated cable has at least one point fixed to the cavity on the top of the tower or fixed to a position on the base frame near the center of the top of the tower.

Preferably, the lightning proof element of the yaw bearing includes at least one brush which slides towards the tower or yaw brake disk.

In addition, the present invention also provides a wind turbine generator system comprising a tower, a nacelle, at least one generator, a hub, at least one rotor blade and the lightning protection device of the present invention as mentioned above.

Preferably, the inventive wind turbine generator system is a PMDD wind turbine generator system.

The advantageous effects of the present invention are as follows:

In the lightning protection device for a wind turbine generator system according to the present invention, the lightning-proof elements are arranged at the root of the blade, in the main rotor shaft and on the top of the tower. These lightning-proof elements, together with the blade arrester, the down lead of the blade, and the grounding cable of the tower, form a discharging path of the lightning current insulated from the respective bearings of the wind turbine generator system, so that the lightning current will not flow through the pitch bearing and the main rotor bearing of the wind turbine generator system. Consequently, the respective bearings in the wind turbine generator system will not be damaged by the lightning current, and the wind turbine generator system is protected efficiently.

Including the aforementioned lightning protection device for a wind turbine generator system, the present invention has the discharging path of lightning current which is insulated from the pitch bearing and the main rotor bearing of the wind turbine generator system. Thereby damages caused on the respective bearings by the lightning current is avoided, the wind turbine generator system is protected efficiently. As a result, the failure ratio and maintenance cost of the wind turbine generator system are reduced dramatically.

DETAILED DESCRIPTION OF THE PREFERRED EMBODIMENTS

The lightning protection device and the wind turbine generator system according to the present invention will now be described in detail with reference to the drawings in order that the person skilled in the art can understand the present invention thoroughly.

The essential principle for the present invention is to establish a new separated discharging path of the lightning current for a wind turbine generator system. In the case of a lighting strike, the lightning current will pass through the new path without passing through the respective bearings in the system. With this path, the normal operation of the bearings in the system, a prolonged lifetime thereof and the normal operation of the PMDD wind turbine generator system can be ensured. As a result, the maintenance cost and the economical loss caused by the operation interruption of the wind turbine generator system are reduced significantly.

Figure 1:
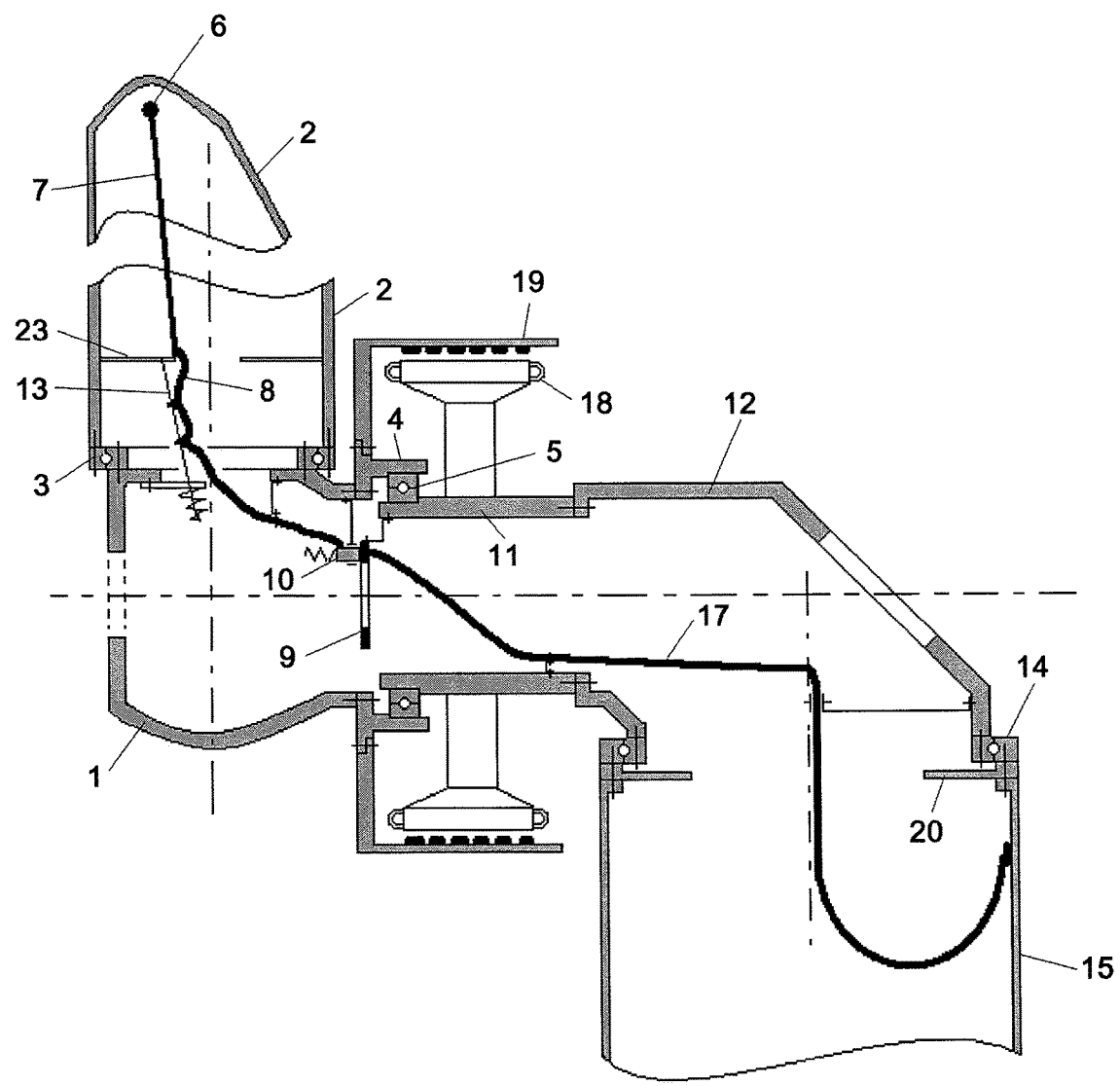
FIG. 1 shows a wind turbine generator system equipped with a lightning protection device according to the first embodiment of the present invention.

FIG. 1 shows a wind turbine generator system equipped with the lightning protection device according to the first embodiment of the present invention. As shown in the FIG. 1, the wind turbine generator system includes a hub 1, a rotor blade 2, a pitch bearing 3, a hollow rotor shaft 4, a rotor bearing 5, an axle 11, a base frame 12, a yaw bearing 14 and a tower 15. The rotor blade 2 is connected to the hub 1 via the pitch bearing 3, the hub 1 is connected to the hollow rotor shaft 4, the hollow rotor shaft 4 is connected to the axle 11 via the rotor bearing 5, the axle 11 is connected to the base frame 12 and the base frame 12 is connected to the tower 15 via the yaw bearing 14. The lightning protection device of the wind turbine generator system includes a blade arrester 6, a down lead of blade 7, a lightning-proof element of the pitch bearing, a lightning-proof element of the rotor bearing, a lightning-proof element of the yaw bearing and the grounded cable of the tower are not shown in the FIG. 1.

The blade arrester 6 is arranged near the blade tip of the blade 2 and at a position at the side of the blade for receiving the lightning current. The down lead of blade 7 is located inside the blade 2 and extends along the blade 2. The down lead of blade 7 is electrically connected to the blade arrester 6 to guide the lightning current downward. The lightning-proof element of the pitch bearing is arranged at the root of the rotor blade 2 with one end electrically connected to the down lead of blade 7 and the other end electrically connected to the lightning-proof element of the rotor bearing. The lightning-proof element of the rotor bearing is arranged on the axle 11 of the generator, with one end electrically connected to the lightning-proof element of the pitch bearing and the other end electrically connected to the lightning-proof element of the yaw bearing. The lightning-proof element of the yaw bearing is arranged on the top of the tower 15 and electrically connected to the grounding cable of the tower. The combination of the blade arrester 6, the down lead of blade 7, the lightning-proof element of the pitch bearing, the lightning-proof element of the rotor bearing, the lightning-proof element of the yaw bearing and the grounding cable of the tower form a discharging path of the lightning current, as shown by the heavy lines in FIG. 1, which is insulated from the pitch bearing, the rotor bearing and the yaw bearing. The discharging path of the lightning current for the lightning protection device of the wind turbine generator system provided in the embodiment is as follows: the blade arrester 6→the down lead of blade 7→the lightning-proof element of the pitch bearing→the lightning-proof element of the rotor bearing→the lightning-proof element of the yaw bearing→the grounding cable of tower→the ground. From this, it can be seen that the discharge of the lightning current will not pass through the main bearings of the wind turbine generator system, and thus will not damage the bearings.

Referring to FIG. 1 again, in the embodiment, the lightning-proof element of the pitch bearing includes a lightning-proof cable 8 and a tensioned rope 13. The lightning-proof cable 8 is a flexible insulated cable being able to rotate in a range of 0-90 degree, with one end fixed to the spacer 23 located at the root of the blade and electrically connected to the down lead of blade 7, the other end fixed inside the hub 1 and electrically connected to the lightning-proof element of the rotor bearing. When the rotor blade 2 is controlled to pitch from 0 to 90 degree, the contour line of movement of the lightning-proof cable 8 is a side face of ¼ taper. In order to prevent the lightning-proof cable 8 from contacting the yaw bearing due to its twisting or swinging during pitching, the tensioned rope 13 is provided in the embodiment. One end of the tensioned rope 13 is fixed to the spacer 23 and the other end is fixed inside the hub 1 by a spring. The lightning-proof cable 8 has at least one point (two points in the embodiment) fixed to the tensioned rope 13, so as to prevent the lightning-proof cable 8 from contacting the yaw bearing due to its twisting or swinging, thereby the pitch bearing 3 can be protected effectively.

It should be noted that, in practice, it is preferable that the number of the lightning-proof elements of the pitch bearing is equal to that of the rotor blades. For example, in the case that the number of the blades in the wind turbine generator system is 3, the number of the lightning-proof elements of the pitch bearing is also 3. That is, one lightning-proof element of the pitch bearing as mentioned above is provided at the root of each rotor blade.

In the present embodiment, the lightning-proof element of the rotor bearing includes a slip ring 9 and a brush 10, wherein the slip ring 9 is fixed to the axle 11. The center axis of the slip ring 9 coincides with the center axis of the axle 11. The brush 10 is fixed to the hub 1, with one end electrically connected to the lightning-proof element of the pitch bearing (i.e., the lightning-proof cable 8), and the other end slidably connected to one end of the slip ring 9. When the hub 1 rotates, the lightning-proof cable 8 would not be twisted and bended as the hub 1 rotates because the brush 10 can be driven by the hub 1 to rotate along the tracks on the slip ring 9, thereby preventing the lightning-proof cable 8 from break due to twisting and bending.

It should be noted that, in the practice, the brush can be fixed to the hollow rotor shaft 4 while the slip ring 9 can be fixed to the axle 11, the slip ring 9 can be fixed to the hub 1 or fixed to the hollow rotor shaft 4 while the brush 10 fixed to the axle 11. When the latter manner is adopted, then the rotation of the hub 1 will make the slip ring 9 rotate. The track inside the slip ring 9 is slidably connected to the brush 10, which also prevents the lightning-proof cable 8 from being twisted and bended as the hub 1 rotates, thereby preventing the lightning-proof cable 8 from break due to twisting and bending.

Furthermore, in order to prevent the slip ring 9 from being damaged by the excessive lightning current, in practice, spark gaps can be set near the slip ring 9. If the lighting current is too large, the spark gaps will conduct a part of the lighting current so that the slip ring 9 will be protected effectively. How to set the spark gaps is known to the skilled person in the art and the skilled person can make suitable arrangement for the spark gaps according to the requirements in practice and thus the description thereof is omitted.

In the embodiment, the lightning-proof element of the yaw bearing includes a lightning-proof cable 17. One end of the lightning-proof cable 17 is fixed inside the base frame 12 and electrically connected to the lightning-proof element of the rotor bearing (that is, electrically connected to the slip ring 9), and the other end is fixed to the inner wall of the tower 15 and electrically connected to the grounded cable of the tower. In the embodiment, a fixture is arranged at a position inside the base frame 12 near the top of the tower 15. One end of the fixture is fixed to the inner wall of the base frame 12, and the other end is fixed at a position of the base frame 12 near the top of the tower 15. The fixture provides a fixing point for the cable in the direction of the center axis of the tower, and a point of the lightning-proof cable 17 can be fixed at the fixing point such that the lightning-proof cable 17 will not contact the yaw bearing. In practice, the lightning-proof cable 17 is preferably fixed at the center of the cavity on the top of the tower. Of course, the lightning-proof cable 17 can be fixed at other places. In this case, the lightning-proof cable 17 should reserve a predetermined length to adapt to the distance change between two fixing positions of the lightning-proof cable 6 during yawing.

In practice, since the yaw bearing can bear a large lightning current, the lightning current may be discharged through the yaw bearing in some cases. In the following, a lightning protection device which discharges the lightning current through the yaw bearing will be described with reference to FIG. 2.

Figure 2:
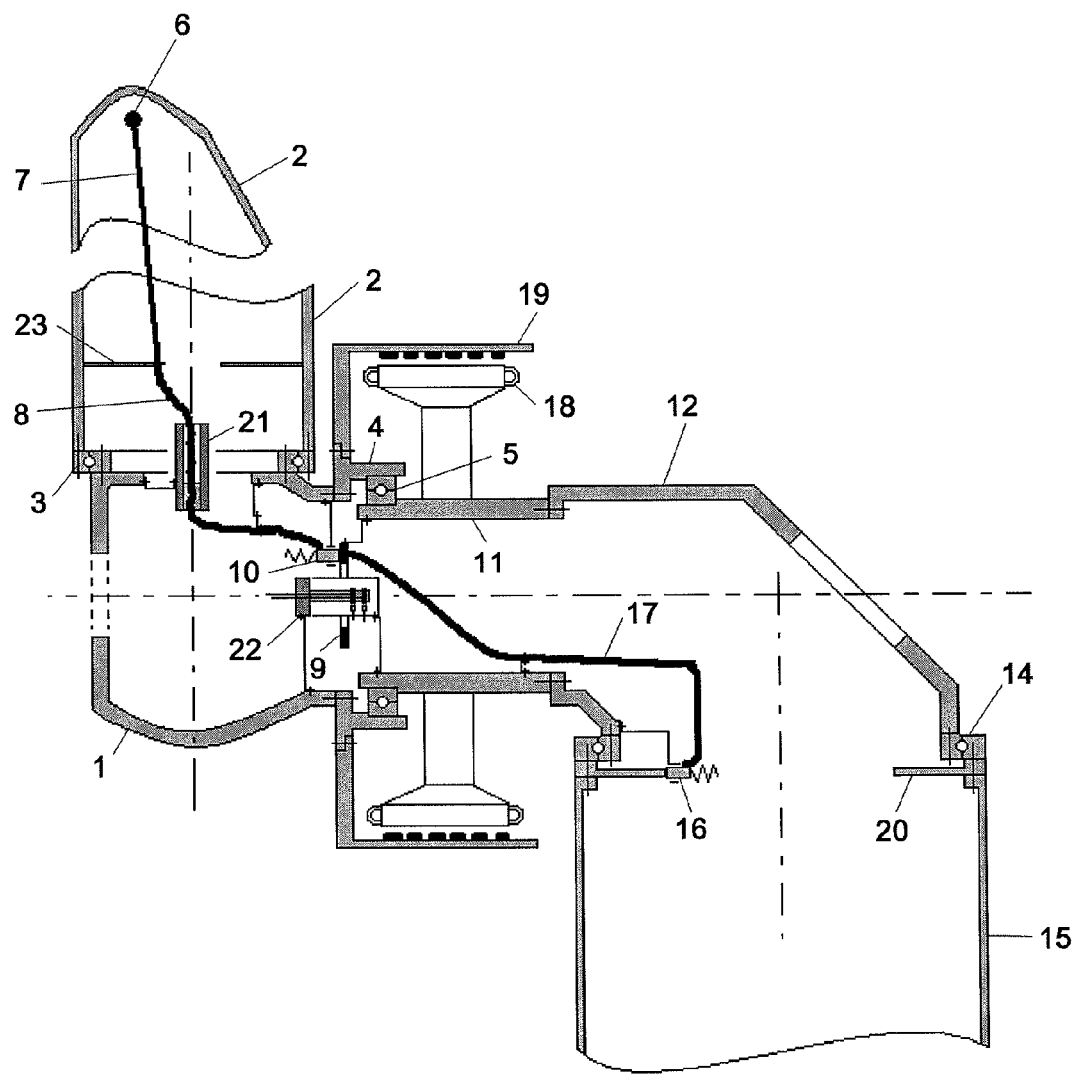
FIG. 2 shows a wind turbine generator system equipped with a lightning protection device according to the second embodiment of the present invention.

Referring to FIG. 2, a wind turbine generator system having a lightning protection device according to the second embodiment of the present invention is shown. As shown in FIG. 2, the lightning protection device in the present embodiment also includes a blade arrester 6, a down lead of blade 7. In addition, there are a lightning-proof element of the pitch bearing, a lightning-proof element of the rotor bearing, a lightning-proof element of the yaw bearing and the grounded cable of the tower, which are not shown in the FIG. 2. However, the lightning-proof element of the pitch bearing, the lightning-proof element of the rotor bearing and the lightning-proof element of the yaw bearing are arranged in a different manner from that of the first embodiment. These elements are arranged as follows.

In the present embodiment, the lightning-proof element of the pitch bearing comprises a lightning-proof cable 8 and a tube 21. One end of the lightning-proof cable 8 is fixed to the spacer 23 positioned at the blade root and is electrically connected to the down lead of blade 7. The other end is fixed to the hub 1 and is electrically connected to the lightning-proof element of the rotor bearing. The tube 21 is fixed inside the hub 1 by a support, and is preferably arranged in the direction of the center axis of the blade. The lightning-proof cable 8 is guided through the tube 21 and it is able to rotate inside the tube 21. Using the tube 21, the lightning-proof cable 8 can be prevented from swinging or twisting during pitching, such that it can be prevented from contacting the pitch bearing 3, and thus the pitch bearing 3 is protected effectively.

The lightning-proof element of the rotor bearing includes a slip ring 9 and a brush 10. The slip ring 9 and the brush 10 may be arranged in a similar manner as in the first embodiment. Of course, the slip ring 9 and the brush 10 may be arranged around or integrated into a slip ring unit 22. Here, the slip ring unit 22 may be a hydraulic or an electrical slip ring unit for switching the pitching signals and supplying power for the pitching system. The slip ring unit 22 may be arranged in the hub 1, preferably along the rotation axis of the rotor of the generator or the center axis of the axle 11 of the generator. In the embodiment, the physical volume of the slip ring unit 22 is smaller than that of the slip ring unit of the lightning-proof element of the rotor bearing formed by the slip ring 9 and the brush 10. The slip ring unit 22 is arranged separately from the slip ring 9 and the brush 10 of the lightning-proof element of the rotor bearing, which ensures that the lightning current passing through the slip ring 9 and the brush 10 of the lightning-proof element of the rotor bearing will not damage the slip ring unit 22. In the embodiment, the lightning-proof element of the yaw bearing includes a lightning-proof cable 17 and a brush 16. One end of the lightning-proof cable 17 is fixed inside the base frame 12 and electrically connected to the lightning-proof cable of the rotor bearing, and the other end is fixed to the brush 16 which is fixed on the top of the tower 15 by a support and slips towards the yaw brake disk 20 by means of a spring. The lightning current conducted by the lightning-proof cable 17 and the brush 16 is discharged through the yaw brake disk and the grounded cable of the tower. Further, in order to prevent the brush 16 from being damaged by the excessive lightning current, a spark gap may be arranged close to the brush 16 in practice. If the lightning current is too large, a part of it can be conducted by the spark gap so that the brush 16 can be protected effectively. How to arrange the spark gap is well known to the skilled person in the art and may be arranged suitably according to actual situations, thus description thereof is omitted herein.

It should be noted that the main design principle of the lightning protection device of the present invention is to make the discharging path of the lightning current pass through the respective cavities in the wind turbine generator system, such as the cavity of the pitch bearing, the cavity of the hub, the cavity of the rotor shaft and the rotor bearing, the cavity of the base frame, the cavity of the yaw bearing, so as to prevent the lightning current from contacting the pitch bearing, the rotor bearing and the yaw bearing. Here, the cavity of the pitch bearing represents the cavity defined by the inner diameter of the pitch bearing, i.e. the hollow part of the pitch bearing; the cavity of the hub represents the hollow part inside the hub; the cavity of the rotor shaft represents the cavity defined by the inner diameter of the rotor shaft, i.e. the hollow part of the rotor shaft; the cavity of the rotor bearing represents the cavity defined by the inner diameter of the rotor bearing, i.e. the hollow part of the rotor bearing; the cavity of the base frame represents the hollow part of the base frame; the cavity of the yaw bearing represents the cavity defined by the inner diameter of the yaw bearing, i.e. the hollow part of the yaw bearing.

Figure 3:
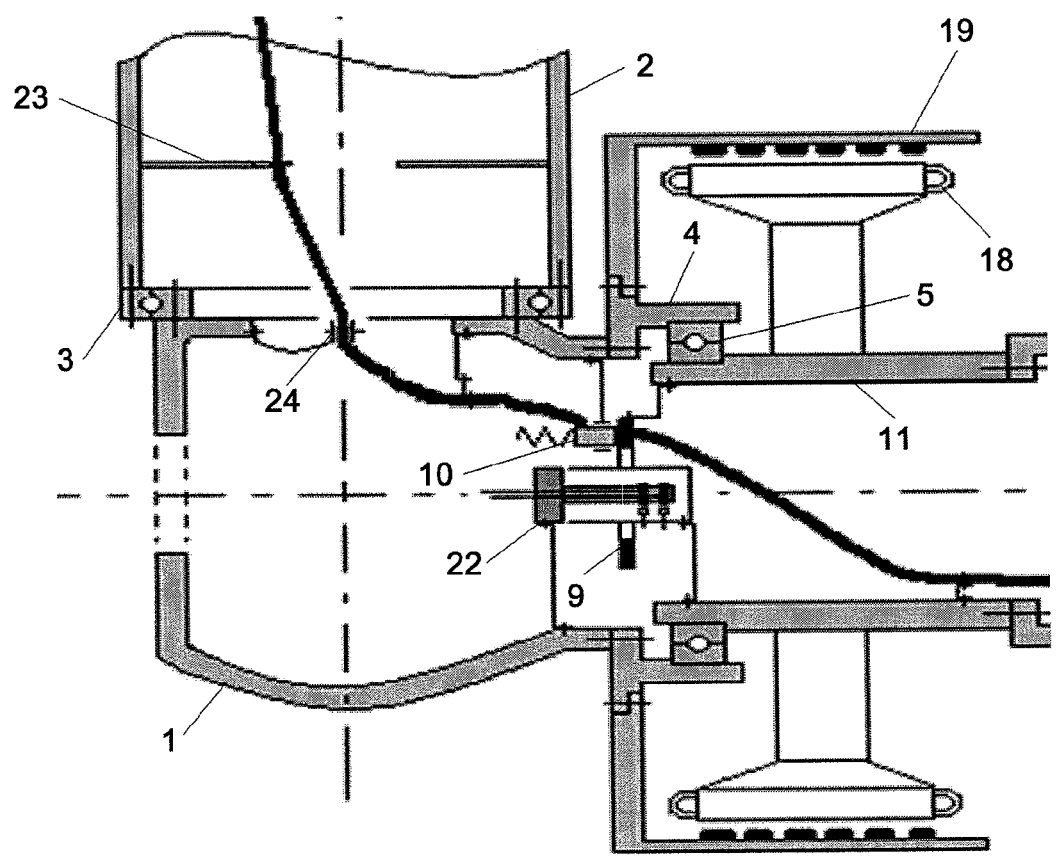
FIG. 3 shows a wind turbine generator system equipped with a lightning protection device according to the third embodiment of the present invention.

The detailed arrangements for the lightning-proof element of the pitch bearing, the lightning-proof element of the rotor bearing, the lightning-proof element of the yaw bearing may be designed in accordance with particular circumstances. For example, in addition to the arrangement shown in FIGS. 1 and 2, the lightning-proof element of the pitch bearing may be arranged in a manner as that in the third embodiment of the present invention as shown in FIG. 3, in which the lightning-proof cable 8 is directly fixed by a limit support 24 so as to prevent the lightning-proof cable 8 from contacting with the pitch bearing due to its twisting or swinging. As for the limit support 24 and the lightning-proof cable 8, they may be arranged in the cavity of the pitch bearing 3 or a position inside the hub 1 near the pitch bearing 3, preferably along the axis direction of the rotor blade 2, or preferably at the center of the cavity of the pitch bearing 3. Furthermore, the lightning-proof element of the pitch bearing may be configured as a brush and a slip ring instead of the lightning-proof cable 8. Specifically, by a support, the brush and the slip ring may by arranged at the root of the rotor blade 2, in the cavity of the pitch bearing 3, or at a position in the hub 1 near the pitch bearing 3, and the brush may be electrically connected to the down lead of blade 7 by a cable and the slip ring may be electrically connected to the lightning-proof element of the rotor bearing by a cable. Similarly, the lightning-proof element of the yaw bearing may be configured as a brush and a slip ring. Specifically, the brush may be arranged at a position on the base frame near the top of the tower 15 and be electrically connected to the lightning-proof element of the rotor bearing by a cable. The slip ring may be fixed on the top of the tower 15 by the support, preferably fixed in the center of the cavity on the top of the tower 15, and may be electrically connected to the grounded cable of the tower. Furthermore, as described above, since the yaw bearing can bear a larger lightning current, the lightning-proof element of the yaw bearing may be omitted in practice. Instead, the lightning-proof element may be directly connected to the base frame or directly connected to the grounded cable of the tower.

As another technical solution of the present invention, there is provided a wind turbine generator system. As shown in FIGS. 1 to 3, the wind turbine generator system of the embodiment of the present invention includes a hub 1, a rotor blade 2, a pitch bearing 3, a hollow rotor shaft 4, a rotor bearing 5, a base frame 12, a yaw bearing 14, a tower 15, a stator 18 and a rotor 19. The rotor blade 2 is fixed to the hub 1 via the pitch bearing 3 and can rotate about the hub 1. The hollow rotor shaft 4 is connected to the hub 1, the rotor 19 and the rotor bearing 5. The rotor bearing 5 is fixed to an axle 11. The axle 11 is connected to the base frame 12 and the base frame is arranged at the tower 15. Furthermore, the wind turbine generator system includes the aforementioned lightning protection device for the wind turbine generator system provided by the embodiments of the present invention. That is, this lightning protection device includes a blade arrester 6, a down lead of blade 7, a lightning-proof element of the pitch bearing, a lightning-proof element of the rotor bearing, a lightning-proof element of the yaw bearing and the grounded cable of the tower which are not shown in the figures. The blade arrester 6 is arranged near the blade tip of the blade 2 and at a position at the side of the blade for receiving the lightning current. The down lead of blade 7 is located inside the rotor blade 2, extends along the rotor blade 2 and is electrically connected to the blade arrester 6, to guide the lightning current downward. The lightning-proof element of the pitch bearing is arranged at the root of the rotor blade 2 with one end electrically connected to the down lead of blade 7 and the other end electrically connected to the lightning-proof element of the rotor bearing. The lightning-proof element of the rotor bearing is arranged on the axle 11 of the generator, with one end electrically connected to the lightning-proof element of the pitch bearing and the other end electrically connected to the lightning-proof element of the yaw bearing. The lightning-proof element of the yaw bearing is arranged at the top of the tower 15 and electrically connected to the grounding cable of the tower. The combination of the blade arrester 6, the down lead of blade 7, the lightning-proof element of the pitch bearing, the lightning-proof element of the rotor bearing, the lightning-proof element of the yaw bearing and the grounding cable of the tower form a discharging path of the lightning current, as shown by the heavy lines in FIG. 1, which is insulated from the pitch bearing, the rotor bearing and the yaw bearing. The discharging path of the lightning current for the lightning protection device of the wind turbine generator system provided in the present invention is as follows: the blade arrester 6→the down lead of blade 7→the lightning-proof element of the pitch bearing→the lightning-proof element of the rotor bearing→the lightning-proof element of the yaw bearing→the grounding cable of the tower→the ground. From this, it can be seen that the discharge of the lightning current will not pass through the respective bearings of the wind turbine generator system, and thus will not damage the bearings.

In an embodiment of the invention, the wind turbine generator system may be a direct-driven permanent magnetic wind turbine generator system.

It will be appreciated that the aforementioned embodiments are only examples for illustrating the principle of the invention. The invention is not limited to these examples. For the skilled in the art, various modifications and changes may be made without departing from the spirit and the essential of the invention and thus falls into the scope of the invention.

The invention claimed is:

1. A lightning protection device for a wind turbine generator system including a rotor connected with a hub and at least one rotor blade, wherein the at least one rotor blade is connected to the hub via a blade pitch bearing, the hub is connected to a hollow rotor shaft and the hollow rotor shaft is supported by at least one rotor bearing, and wherein the blade pitch bearing has a cavity therein and the at least one rotor bearing has a cavity defined by an inner diameter of the rotor bearing, the lightning protection device includes:
a blade arrester located near a blade tip and at a side of the at least one rotor blade, a down lead of the at least one rotor blade connected to the blade arrester, a lightning protection element of the blade pitch bearing and a lightning protection element of the at least one rotor bearing, wherein the lightning protection element of the blade pitch bearing is provided at a blade root, one end of the lightning protection element of the blade pitch bearing is connected to the down lead of at least one rotor blade and another end is connected to the lightning protection element of the rotor bearing;
wherein,
the lightning protection device forms a lightning current conducting path which is passing through the cavity of the blade pitch bearing, a hollow portion of the hollow rotor shaft and the cavity of the rotor bearing;
the lightning protection element of the rotor bearing includes a slip ring with at least one brush; and
the slip ring of the lightning protection element of the rotor bearing is arranged around an electrical or hydraulic slip ring unit of the wind turbine generator system.

2. A lightning protection device according to claim 1, wherein, the lightning protection element of the blade pitch bearing includes a flexible insulated cable.

3. A lightning protection device according to claim 2, wherein, the lightning protection element of the blade pitch bearing includes a tensioned rope for limiting a position of the flexible insulated cable, wherein two ends of the tensioned rope are connected to a fixed point at the at least one rotor blade and a fixed point at the hub respectively, and the flexible insulated cable has at least one point fixed to the tensioned rope.

4. A lightning protection device according to claim 3, wherein, the flexible insulated cable of the lightning protection element of the blade pitch bearing is tensioned between the fixed point at the at least one rotor blade and the fixed point at the hub along a direction of an axis of the blade pitch bearing.

5. A lightning protection device according to claim 2, wherein, the lightning protection element of the blade pitch bearing further includes a tube for position limitation arranged in the cavity of the blade pitch bearing, the flexible insulated cable passing through the tube and capable of rotating in the tube.

6. A lightning protection device according to claim 1, wherein, the lightning protection element of the blade pitch bearing includes a slip ring with at least one brush.

7. A lightning protection device according to claim 1, wherein, the at least one brush of the lightning protection element of the rotor bearing rotates along with the hub and is fixed to the hub or to the hollow rotor shaft, and the slip ring of the lightning protection element of the rotor bearing is fixed to an axle or to a base frame of a generator.

8. A lightning protection device according to claim 1, wherein, the slip ring of the lightning protection element of the rotor bearing rotates along with the hub and is fixed to the hub or to the hollow rotor shaft, and the at least one brush of the lightning protection element of the rotor bearing is fixed to an axle or to a base frame of a generator.

9. A lightning protection device according to claim 1, wherein, one end of the lightning protection element of the rotor bearing is electrically connected to an axle or a base frame of a generator.

10. A lightning protection device according to claim 1, wherein, one end of the lightning protection element of the rotor bearing is electrically connected to a lightning protection element of a yaw bearing, and the lightning protection element of the yaw bearing is electrically connected to a tower.

11. A lightning protection device according to claim 10, wherein, the lightning protection element of the yaw bearing includes a flexible insulated cable, wherein one end of the flexible insulated cable is fixed to a base frame and electrically connected to the lightning protection element of the rotor bearing, and another end is fixed to the tower, and wherein the flexible insulated cable has at least one point fixed to a cavity on a top of the tower or fixed at a position on a base frame near a center on the top of the tower.

12. A lightning protection device according to claim 10, wherein, the lightning protection element of the yaw bearing includes at least one brush, which is in slidable contact with the tower or a yaw brake disk.

13. A wind turbine generator system, including a tower, a nacelle, at least one generator, a hub and at least one rotor blade, wherein, including the lightning protection device according to claim 1.

14. The wind turbine generator system according to claim 13, wherein, the wind turbine generator is a direct-driven permanent magnetic generator.

* * * * *

UNITED STATES PATENT AND TRADEMARK OFFICE
CERTIFICATE OF CORRECTION

PATENT NO. : 9,752,560 B2
APPLICATION NO. : 14/366753
DATED : September 5, 2017
INVENTOR(S) : Huang et al.

It is certified that error appears in the above-identified patent and that said Letters Patent is hereby corrected as shown below:

On the Title Page

<u>Column 1</u>
Item (73) please add "VENSYS ENERGY AG" as an Assignee

Signed and Sealed this
Twenty-eighth Day of May, 2019

Andrei Iancu
*Director of the United States Patent and Trademark Office*